(12) United States Patent
Watanabe

(10) Patent No.: US 7,668,462 B2
(45) Date of Patent: Feb. 23, 2010

(54) OPTICAL WIRELESS COMMUNICATION DEVICE

(75) Inventor: Nobuhisa Watanabe, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 482 days.

(21) Appl. No.: 11/797,999

(22) Filed: May 9, 2007

(65) Prior Publication Data

US 2007/0297717 A1    Dec. 27, 2007

(30) Foreign Application Priority Data

Jun. 13, 2006    (JP)    ............... 2006-163602

(51) Int. Cl.
*H04B 10/00*    (2006.01)
(52) U.S. Cl. .............. 398/106; 398/107; 398/127; 398/135
(58) Field of Classification Search .......... 398/15, 398/25, 30, 31, 106, 107, 127, 135, 136, 398/138, 128, 171, 172
See application file for complete search history.

(56) References Cited

U.S. PATENT DOCUMENTS 7,356,019 B2 *    4/2008    Hirt et al. ............... 370/347

2007/0114967 A1 *    5/2007    Peng ................... 320/101

FOREIGN PATENT DOCUMENTS

| JP | 1-245791 A | 9/1989 |
| JP | 4-58627 A | 2/1992 |
| JP | 9-307503 A | 11/1997 |
| JP | 10-105303 A | 4/1998 |
| JP | 10-107556 A | 4/1998 |
| JP | 10-187564 A | 7/1998 |
| JP | 11-112431 A | 4/1999 |
| JP | 11-127115 A | 5/1999 |
| JP | 2000-194458 A | 7/2000 |
| JP | 2002-152138 A | 5/2002 |
| JP | 2005-286646 A | 10/2005 |
| JP | 2005-328360 A | 11/2005 |

* cited by examiner

*Primary Examiner*—Dalzid Singh
(74) *Attorney, Agent, or Firm*—Birch, Stewart, Kolasch & Birch LLP

(57) ABSTRACT

An optical wireless communication device mounted in electronic equipment includes: a light-receiving element for receiving an optical communication signal; and a control unit that monitors a received light output of the light-receiving element. When the control unit determines that the received light output represents the optical communication signal, it selects and executes communication mode for the optical communication signal. When the control unit determines that the received light output does not represent the optical communication signal, it selects and executes charge mode in which the received light output is used as a charge power.

20 Claims, 2 Drawing Sheets

OPTICAL WIRELESS COMMUNICATION DEVICE

BACKGROUND OF THE INVENTION

This application claims priority under 35 U.S.C. §119(a) on Patent Application No. 2006-163602 filed in Japan on Jun. 13, 2006, the entire contents of which are hereby incorporated herein.

The present invention relates to an optical wireless communication device mounted in electronic equipment.

As widely known, IrDA 1.0 and IrDA 1.1, standards for optical wireless communication devices that allow wireless communication between different pieces of equipment using light, were established in 1994. These standards do not require the formation of networks and readily allow peer-to-peer (one to one) communication. Currently, they are implemented mainly in cell phones, and are expected to be implemented in printers and television receivers in the future.

Optical wireless communication devices as described above, which are mounted in, for example, cell phones, function mainly to communicate small-volume text data such as telephone numbers and e-mail addresses. If they are mounted in printers and television receivers in the future, the need will arise to communicate still images and moving images. Along with this need, higher speed communication as well as an extension of communication distance will be required.

The IrDA 1.2 standard for optical wireless communication devices provides lower power consumption for infrared communication devices.

Although there exists a strong demand for higher communication speed and extended communication distance, satisfying these two requirements requires more power consumption.

In other words, increasing communication speed and communication distance is contradictory to providing lower power consumption, and therefore it is difficult to satisfy these contradictory requirements.

In view of this, JP 2005-328360A proposes to execute a shutdown mode during which almost no current flows while no signal is present, so as to reduce the power consumption of a device. More specifically, as shown in the flowchart of FIG. 3, when the shutdown mode is executed during the stand-by state (step S101), the control unit determines whether or not to permit communication (step S102), if it determines not to permit communication (i.e., when "No" is selected in step S101), the shutdown mode is maintained. If the control unit determines to permit communication (i.e., when "Yes" is selected in step 102), communication is carried out (step 103). After the completion of the communication, it switches back to the shutdown mode. This reduces the power consumption while the device is does not communicate.

Also, according to JP 11-112431A, a light-emitting element is allowed to emit radiation at a minimum intensity that does not affect communication quality so as to reduce the power consumption of a device.

However, even if shutdown mode is executed while no signal is present as disclosed in JP 2005-328360A or a light-emitting element is allowed to emit radiation at a minimum intensity as disclosed in JP 11-112431A, the power consumption of a device will be reduced only slightly, and these techniques cannot achieve both an increase in communication speed and communication distance and a reduction of power consumption to a lower level as described above.

The present invention has been accomplished in view of the problems encountered with such conventional techniques. It is an object of the present invention to provide an optical wireless communication device capable of both increasing communication speed and communication distance as well as reducing power consumption to a lower level.

SUMMARY OF THE INVENTION

In order to solve the above problems, the present invention provides an optical wireless communication device mounted in electronic equipment comprising: a light-receiving element for receiving an optical communication signal; and a control unit that monitors a received light output of the light-receiving element, wherein when the control unit determines that the received light output represents the optical communication signal, it selects and executes communication mode for the optical communication signal, and when the control unit determines that the received light output does not represent the optical communication signal, it selects and executes charge mode in which the received light output is used as a charge power.

In another aspect, the present invention provides an optical wireless communication device mounted in electronic equipment comprising: a light-receiving element for receiving an optical communication signal; and a control unit that monitors a received light output of the light-receiving element, wherein when the control unit determines that the received light output represents the optical communication signal, it selects and executes communication mode for the optical communication signal, and when the control unit determines that the received light output does not represent the optical communication signal, it selects and executes charge mode in which the received light output is used as a charge power and the charge power is used as an operating power.

According to the optical wireless communication device of the present invention as configured above, the control unit monitors the received light output of the light-receiving element. When the control unit determines that the received light output represents an optical communication signal, it selects and executes a communication mode for the optical communication signal. When the control unit determines that the received light output does not represent an optical communication signal, the control unit selects and executes a charge mode in which the received light output is used as a charge power. Alternatively, the control unit selects and executes the charge mode, and the charge power is used as an operating power. Accordingly, the light-receiving element functions not only to receive an optical communication signal, but also to supply the charge current. Because of this, the charge power from the light-receiving element can be used as a supplemental operating power for operating the optical wireless communication device or electronic equipment including the optical wireless communication device without compromising the primary function of communication. It is therefore possible to reduce the power consumption by the amount of the charge power. Further, if the charge power (i.e., the received light output of the light-receiving element) is sufficiently large, the optical wireless communication device or the electronic equipment can be operated only with this charge power, achieving substantially zero power consumption.

Moreover, because the charge power is supplied, it is possible to achieve lower power consumption while increasing the operating power for operating the optical wireless communication device or the electronic equipment. This achieves both an increase in communication speed and communication distance and a reduction of power consumption to a lower level.

In the present invention, the light-receiving element can be a photodiode.

In this case, because a photodiode is used as the light-receiving element, it is possible to provide an optical wireless communication device having high precision at low cost.

In the present invention, a carrier wave of the optical communication signal can be an infrared beam.

In this case, because an infrared beam is used as the carrier wave of the optical communication signal, it is possible to further enhance the security for communicated information during the communication mode.

In the present invention, the optical communication signal can include a header signal at the beginning of the optical communication signal.

In the present invention, when the charge mode is selected and executed, the control unit, upon extraction and detection of the header signal of the optical communication signal from the received light output of the light-receiving element, switches from the charge mode to the communication mode.

In this case, because the control unit switches from the charge mode to the communication mode when it extracts and detects the header signal of the optical communication signal, it is possible to avoid unnecessary communication operation and thus to reduce the power consumption.

In the present invention, when the control unit does not extract and detect the header signal of the optical communication signal from the received light output of the light-receiving element for a predetermined length of time, the control unit selects and executes the charge mode.

In this case, because the control unit selects and executes the charge mode when the control unit does not extract and detect the header signal of an optical communication signal from the received light output of the light-receiving element for a predetermined length of time, it is possible to accurately execute the charge mode without executing the charge mode during the communication, ensuring the reduction of power consumption to a lower level.

In the present invention, a timer may be provided to measure the predetermined length of time.

In this case, because a timer is provided to measure the predetermined length of time, it is possible to quickly switch to the charge mode without wasting time.

In the present invention, when ambient light is received by the light-receiving element, the received light output of the light-receiving element is determined not to represent the optical communication signal, the charge mode is executed, and the received light output can be used as a charge power.

In the present invention, when room light or light from the sun is received by the light-receiving element, the received light output of the light-receiving element is determined not to represent the optical communication signal, the charge mode is executed, and the received light output can be used as a charge power.

According to the configuration as described above, when ambient light is received, the received light output of the light-receiving element is determined not to represent an optical communication signal, the charge mode is executed, and the received light output is used as a charge power. Alternatively, when room light or light from the sun is received, the received light output of the light-receiving element is determined not to represent an optical communication signal, the charge mode is executed, and the received light output is used as a charge power. With this configuration, it is possible to improve the power efficiency of an entire system by efficiently employing the energy of room light without wasting it or by utilizing inexhaustible light energy from the sun.

In the present invention, the electronic equipment can be a cell phone.

In the present invention, the control unit can supply the charge power to a battery of the cell phone to charge the battery during the charge mode.

According to the configuration as described above, the electronic equipment including the optical wireless communication device is a cell phone. The charge power is supplied to a battery of the cell phone to charge the battery during the charge mode. With this configuration, it is possible to achieve a more efficient use of power in the cell phone and improves the convenience of the cell phone by shortening the time during which the cell phone is placed on a charger (i.e., the time during which the cell phone cannot be used). Further, if the charge power (i.e., the received light output of the light-receiving element) is sufficiently large, the cell phone can be operated only with this charge power, achieving substantially zero power consumption. This eliminates the need to place the cell phone on a charger, which significantly improves the convenience of the cell phone.

In the present invention, the electronic equipment can be a printer.

In the present invention, the control unit can supply the charge power to the printer during the charge mode to assist the operation of the printer.

In the present invention, the electronic equipment can be a television receiver.

In the present invention, the control unit can supply the charge power to the television receiver during the charge mode to assist the operation of the television receiver.

According to the configuration as described above, the electronic equipment including the optical wireless communication device is a printer or a television receiver. The charge power is supplied to the printer or television receiver during the charge mode to assist the operation of the printer or television receiver. With this configuration, it is possible to achieve a more efficient use of power in the printer or the television receiver.

DESCRIPTION OF THE PREFERRED EMBODIMENTS

Hereinafter, an embodiment of the present invention will be described in detail with reference to the accompanying drawings.

Figure 1:
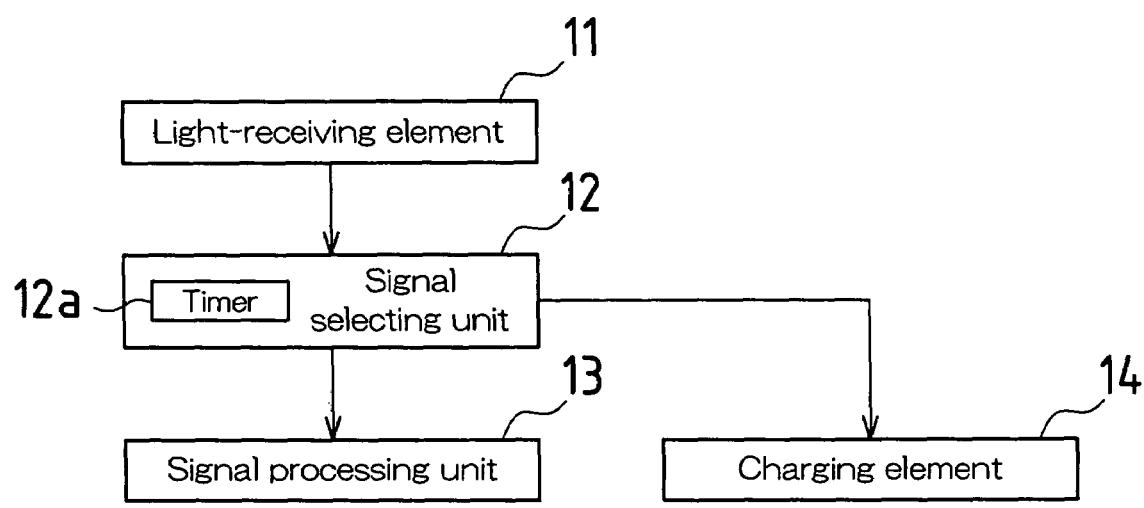
FIG. 1 is a block diagram schematically showing an optical wireless communication device according to an embodiment of the present invention.

FIG. 1 is a block diagram schematically showing an optical wireless communication device according to an embodiment of the present invention. The optical wireless communication device of this embodiment is mounted in, for example, a cell phone and is used to communicate small-volume text data (e.g., telephone numbers, e-mail addresses) with other piece(s) of equipment.

This optical wireless communication device includes a light-receiving element 11, a signal selecting unit 12, a signal processing unit 13 and a charging element 14. The light-receiving element 11 receives an optical communication signal emitted from other piece(s) of equipment. The signal selecting unit 12 receives a received light output of the light-receiving element 11 and outputs the received light output to either the signal processing unit 13 or the charging element 14. The signal processing unit 13 processes the optical communication signal represented by the received light output of the light-receiving element 11 inputted through the signal selecting unit 12. The charging element 14 uses the received light output of the light-receiving element 11 inputted through the signal selecting unit 12 as a charge current.

The optical wireless communication device may further include a light-emitting element that emits an optical communication signal. The cell phone that can include the optical wireless communication device of the present invention may have any configuration as long as it can communicate information with other piece(s) of equipment.

Although the light-receiving element 11 may be of any type as long as it is a photoelectric conversion element, a photodiode is preferably used. With the use of a photodiode, it is possible to achieve an optical wireless communication device having high precision at low cost. This light-receiving element 11 can receive an optical communication signal as well as room light and ambient light from the sun or the like, can photoelectrically convert these types of light, and can output the received light output to the signal selecting unit 12.

The signal selecting unit 12 determines, upon receiving the received light output from the light-receiving element 11, whether or not the received light output represents an optical communication signal. For example, in the case where the optical communication signal contains a header signal at the beginning thereof, the signal selecting unit 12 extracts and detects the header signal from the received light output. When the signal selecting unit 12 can detect a header signal, it determines that the received light output represents an optical communication signal. When the signal selecting unit 12 cannot detect a header signal, it determines that the output does not represent an optical communication signal. When the signal selecting unit 12 can detect a header signal and determines that the received light output represents an optical communication signal, it outputs the received light output to the signal processing unit 13. When the signal selecting unit 12 cannot detect a header signal and determines that the received light output does not represent an optical communication signal, it outputs the received light output to the charging element 14. By detecting this header signal, the signal selecting unit 12 can identify the optical communication signal more reliably and can output the received light output to the signal processing unit 13. This can prevent communication errors and unnecessary operation of the signal processing unit 13, whereby the power consumption can be reduced.

The signal processing unit 13 processes, upon receiving the received light output of the light-receiving element 11, the optical communication signal represented by the received light output. The signal processing unit 13 identifies, for example, text data (e.g., telephone numbers, e-mail addresses) represented by the optical communication signal and outputs the text data to the memory or the display unit of the cell phone.

The charging element 14 charges the received light output of the light-receiving element 11 upon receiving the received light output. This charging element 14 can be any element as long as it can charge the received light output. For example, the charging element 14 can be a secondary battery. The charging element 14 may be incorporated in the optical wireless communication device or a cell phone including the optical wireless communication device.

As the carrier wave of the optical communication signal received by the light-receiving element 11 of this optical wireless communication device, an infrared beam is used. Infrared beams have strong rectilinear propagation property and can be blocked even by a piece of paper, for example. By using an infrared beam as the carrier wave of the optical communication signal, the leakage of information represented by the optical communication signal can be reduced to a minimum, leading to the establishing of high security communication. For this reason, the light-receiving element 11 preferably has a high photoelectric conversion efficiency for infrared beams.

When the light-receiving element 11 has a high photoelectric conversion efficiency for infrared beams, because room light and ambient light from the sun contain a large amount of infrared light, the light-receiving element 11 can photoelectrically convert the ambient light in an efficient manner, and the charging element 14 can be charged sufficiently with the received light output of the light-receiving element 11. Thereby, it is possible to efficiently use ambient light, which used to be ignored as noise, as a charge energy. It is also possible to improve the power efficiency of an entire system by efficiently employing the energy of room light without wasting it or by utilizing the inexhaustible light energy from the sun.

Figure 2:
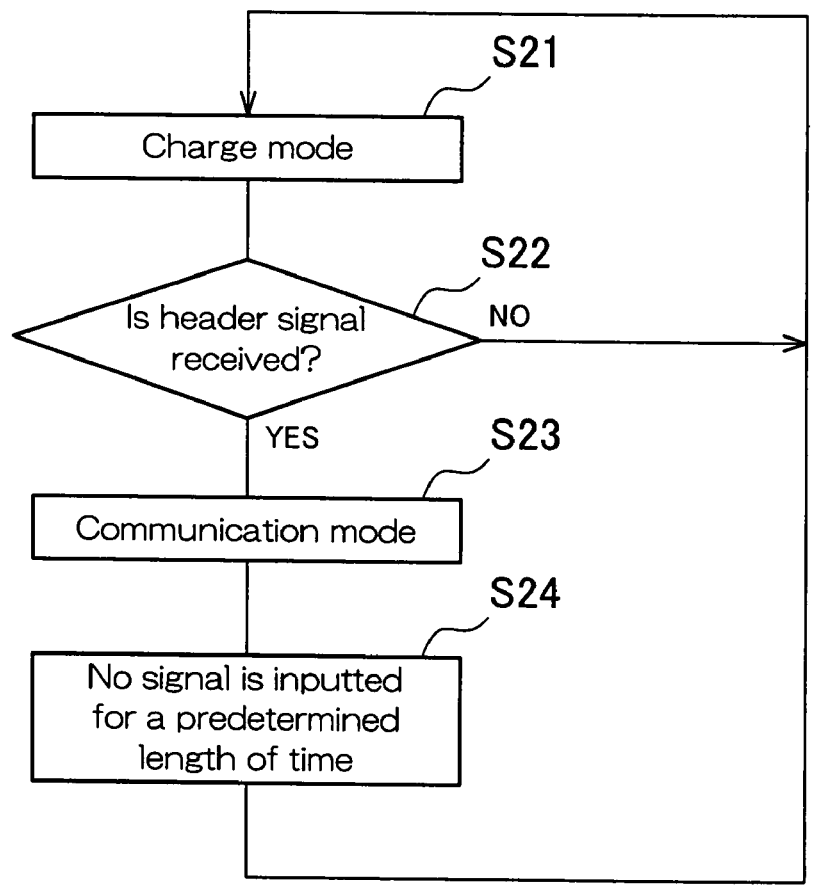
FIG. 2 is a flowchart showing the process for communication and charging in the optical wireless communication device of FIG. 1.
Figure 3:
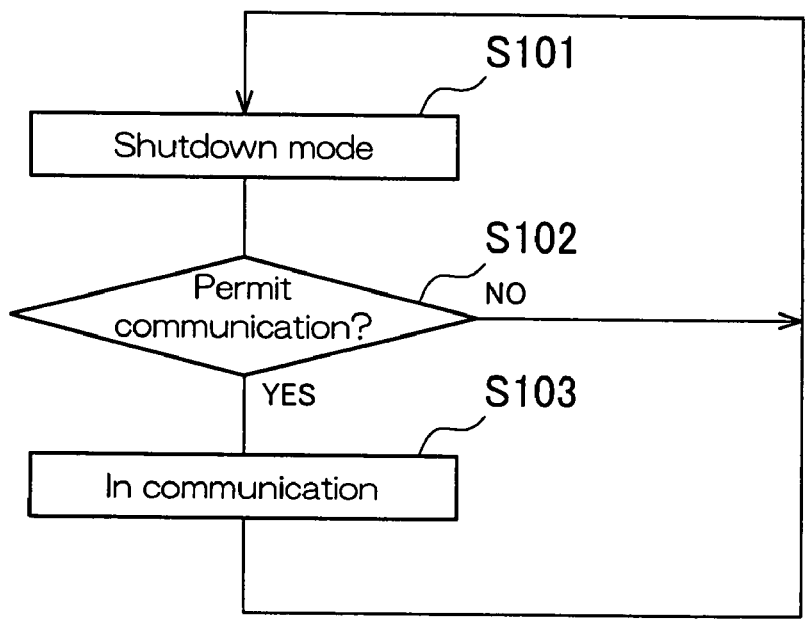
FIG. 3 is a flowchart showing a conventional process for reducing power consumption.

A description is subsequently given of the process for communication and charging in the optical wireless communication device according to this embodiment with reference to the flowchart of FIG. 2.

In the standby state, the signal selecting unit 12 executes a charge mode (step S12) and outputs the received light output of the light-receiving element 11 to the charging element 14. Thereby, the charging element 14 is charged.

During this process, the signal selecting unit 12 extracts and detects the header signal from the received light output of the light-receiving element 11. If the signal selecting unit 12 cannot detect a header signal, it determines that the received light output does not represent an optical communication signal (i.e., when "No" is selected in step S22), and the signal selecting unit 12 maintains the charge mode (step 21).

If the signal selecting unit 12 can extract and detect the header signal from the received light output of the light-receiving element 11, it determines that the received light output represents an optical communication signal (i.e., when "Yes" is selected in step S22), and the signal selecting unit 12 switches from the charge mode to the communication mode (step 23) and stops outputting the received light output of the light-receiving element 11 to the charging element 14. Instead, the signal selecting unit 12 outputs the received light output of the light-receiving element 11 to the signal processing unit 13. The signal processing unit 13 processes the optical communication signal represented by the received light output upon receiving the received light output of the light-receiving element 11.

During the communication mode, power is supplied from the charging element 14 to the optical wireless communication device or the cell phone, and the charge power charged during the charge mode is consumed.

According to another aspect, when the signal selecting unit 12 extracts and detects the header signal from the received light output of the light-receiving element 11, a timer 12*a* mounted in the signal selecting unit 12 may be activated. The timer 12*a* starts measuring time upon activation. The timer 12*a* is reset to its default value before the activation every time the header signal is detected by the signal selecting unit 12. Accordingly, when the header signal is detected by the signal selecting unit 12 repeatedly at a short interval, the timer 12*a* is repeatedly reset to its default value. Therefore, the timer 12a does not stop measuring the predetermined length of time.

During the communication mode, when the light-receiving element 11 does not receive an optical communication signal for a while, the header signal is not detected by the signal selecting unit 12, and thus the timer 12a stops measuring time. In this situation, the signal selecting unit 12 determines that the communication is ended, so that it switches back to the charge mode (step S21), and stops outputting the received light output of the light-receiving element 11 to the signal processing unit 13. Instead, the signal selecting unit 12 outputs the received light output of the light-receiving element 11 to the charging element 14. Thereby, the charging element 14 is charged again.

As described above, according to this embodiment, when the signal selecting unit 12 cannot extract and detect a header signal from the received light output of the light-receiving element 11, it determines that the received light output does not represent an optical communication signal, and executes the charge mode. Conversely, when the signal selecting unit 12 can extract and detect a header signal from the received light output of the light-receiving element 11, it determines that the received light output represents an optical communication signal, and executes the communication mode. During the communication mode, the power is supplied from the charging element 14 to the optical wireless communication device or the cell phone, and the charge power charged during the charge mode is consumed. Thereby, the charge power can be used as supplemental operating power for operating the optical wireless communication device or the cell phone without compromising the primary function of communication, and the power consumption can be reduced by the amount of the charge power. Further, if the charge power (i.e., the received light output of the light-receiving element) is sufficiently large, the optical wireless communication device or the cell phone can be operated only with this charge power, achieving substantially zero power consumption.

By supplying the power from the charging element 14 to the cell phone, a more efficient use of power can be achieved in the cell phone, and therefore the time during which the cell phone is placed on a charger (i.e., the time during which the cell phone cannot be used) can be shortened. Consequently, the convenience of the cell phone can be improved. If the charge power is sufficiently large, substantially zero power consumption can be achieved. This eliminates the need to place the cell phone on a charger, which significantly improves the convenience of the cell phone.

Further, because the charge power is supplied, it is possible to achieve the reduction of power consumption to a lower level while increasing the operating power for operating the optical wireless communication device or the cell phone. This achieves both an increase in communication speed and communication distance and a reduction of power consumption to a lower level.

It should be understood that the present invention is not limited to the embodiment given above and various modifications may be made. The optical wireless communication device of the present invention is applicable not only to cell phones but also to other electronic equipment. For example, the optical wireless communication device can be applied to a printer or a television receiver. During the charge mode, the charge power is supplied to the printer or the television receiver to assist the operation of the printer or the television receiver. Thereby, it is possible to achieve a more efficient use of power in the printer or the television receiver.

The present invention can be embodied and practiced in other different forms without departing from the gist and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An optical wireless communication device mounted in electronic equipment comprising:
    a light-receiving element for receiving an optical communication signal; and
    a control unit that monitors a received light output of the light-receiving element,
    wherein when the control unit determines that the received light output represents the optical communication signal, it selects and executes communication mode for the optical communication signal, and when the control unit determines that the received light output does not represent the optical communication signal, it selects and executes charge mode in which the received light output is used as a charge power.

2. The optical wireless communication device according to claim 1,
    wherein the light-receiving element is a photodiode.

3. The optical wireless communication device according to claim 1,
    wherein a carrier wave of the optical communication signal is an infrared beam.

4. The optical wireless communication device according to claim 1,
    wherein the optical communication signal includes a header signal at the beginning of the optical communication signal.

5. The optical wireless communication device according to claim 4,
    wherein when the charge mode is selected and executed, the control unit, upon extraction and detection of the header signal of the optical communication signal from the received light output of the light-receiving element, switches from the charge mode to the communication mode.

6. The optical wireless communication device according to claim 4,
    wherein when the control unit does not extract and detect the header signal of the optical communication signal from the received light output of the light-receiving element for a predetermined length of time, the control unit selects and executes the charge mode.

7. The optical wireless communication device according to claim 6, further comprising a timer for measuring the predetermined length of time.

8. The optical wireless communication device according to claim 1,
    wherein when ambient light is received by the light-receiving element, the received light output of the light-receiving element is determined not to represent the optical communication signal, the charge mode is executed, and the received light output is used as a charge power.

9. The optical wireless communication device according to claim 1,
    wherein when room light or light from the sun is received by the light-receiving element, the received light output of the light-receiving element is determined not to represent the optical communication signal, the charge mode is executed, and the received light output is used as a charge power.

10. The optical wireless communication device according to claim 1,
wherein the electronic equipment is a cell phone.

11. The optical wireless communication device according to claim 10,
wherein the control unit supplies the charge power to a battery of the cell phone to charge the battery during the charge mode.

12. The optical wireless communication device according to claim 1,
wherein the electronic equipment is a printer.

13. The optical wireless communication device according to claim 12,
wherein the control unit supplies the charge power to the printer during the charge mode to assist the operation of the printer.

14. The optical wireless communication device according to claim 1,
wherein the electronic equipment is a television receiver.

15. The optical wireless communication device according to claim 14,
wherein the control unit supplies the charge power to the television receiver during the charge mode to assist the operation of the television receiver.

16. An optical wireless communication device mounted in electronic equipment comprising:
a light-receiving element for receiving an optical communication signal; and
a control unit that monitors a received light output of the light-receiving element,
wherein when the control unit determines that the received light output represents the optical communication signal, it selects and executes communication mode for the optical communication signal, and when the control unit determines that the received light output does not represent the optical communication signal, it selects and executes charge mode in which the received light output is used as a charge power and the charge power is used as an operating power.

17. The optical wireless communication device according to claim 16,
wherein the light-receiving element is a photodiode.

18. The optical wireless communication device according to claim 16,
wherein a carrier wave of the optical communication signal is an infrared beam.

19. The optical wireless communication device according to claim 16, wherein the optical communication signal includes a header signal at the beginning of the optical communication signal.

20. The optical wireless communication device according to claim 16,
wherein when ambient light is received by the light-receiving element, the received light output of the light-receiving element is determined not to represent the optical communication signal, the charge mode is executed, and the received light output is used as a charge power.

* * * * *